United States Patent [19]

Barecki et al.

[11] 4,194,716
[45] Mar. 25, 1980

[54] AIR SUSPENSION DRIVER'S SEAT

[75] Inventors: Chester J. Barecki, Grand Rapids; Larry A. Wilkerson, Wyoming, both of Mich.

[73] Assignee: American Seating Company, Grand Rapids, Mich.

[21] Appl. No.: 881,905

[22] Filed: Feb. 27, 1978

[51] Int. Cl.² ................... A45D 19/04; F16M 13/00
[52] U.S. Cl. .................... 248/575; 248/585; 248/561; 248/394; 248/421; 248/430
[58] Field of Search .............. 248/393–397, 248/399, 400, 157, 419, 420, 421, 424, 429, 430; 297/325–328, 344–346

[56] References Cited

U.S. PATENT DOCUMENTS

| | | | |
|---|---|---|---|
| 2,324,207 | 7/1943 | Gsell | 248/430 |
| 2,689,730 | 9/1954 | Tebbs | 74/54 X |
| 2,742,952 | 4/1956 | Bellamy | 248/430 |
| 2,753,947 | 7/1956 | Mach | 296/65 R X |
| 2,858,877 | 11/1958 | Krause | 296/65 R |
| 3,100,617 | 8/1963 | Radke et al. | 248/430 |
| 3,258,241 | 6/1966 | Oswald | 248/430 |
| 3,594,040 | 7/1971 | Monroe | 297/346 X |
| 3,622,202 | 11/1971 | Brown | 248/429 X |
| 3,685,780 | 8/1972 | Stannebein | 248/430 X |
| 3,702,179 | 11/1972 | Radke et al. | 248/430 |
| 3,957,243 | 5/1976 | Costin et al. | 248/430 X |
| 4,008,920 | 2/1977 | Arndt | 248/397 X |

FOREIGN PATENT DOCUMENTS

| | | | |
|---|---|---|---|
| 1630080 | 8/1971 | Fed. Rep. of Germany | 297/346 |
| 2304951 | 8/1973 | Fed. Rep. of Germany | 248/393 |
| 144017 | 6/1920 | United Kingdom | 248/429 |
| 434983 | 9/1935 | United Kingdom | 248/429 |
| 699612 | 11/1953 | United Kingdom | 297/346 |

Primary Examiner—Lawrence J. Staab
Attorney, Agent, or Firm—Price, Heneveld, Huizenga & Cooper

[57] ABSTRACT

A transportation seat primarily adapted for use by an operator of a vehicle is disclosed. The seat includes an air suspension base supporting a tubular seat frame to which seat back and bench cushions are attached. A track support frame is slidably mounted on the base for stepwise fore and aft adjustment. The seat frame is secured to the track support frame by an antislap mechanism which isolates the seat frame from jarring movement of the vehicle. A side saddle adjustment mechanism supports the seat frame on the track support frame permitting stepwise transverse adjustment of the seat frame relative to the base.

20 Claims, 19 Drawing Figures

AIR SUSPENSION DRIVER'S SEAT

BACKGROUND OF THE INVENTION

The present invention relates to transportation seating for vehicles such as trains, buses, trucks, boats, airplanes and the like and more particularly, to an adjustable seat primarily adapted for the operators of such vehicles.

Heretofore a wide variety of transportation seats have been proposed for use in vehicles. The type of seat employed usually depends upon the use to which the seat will be put as well as the type of vehicle within which it is installed. For example, mass transportation vehicles such as buses, planes, trains, and boats employ multi-passenger seats subject to different use requirements than the seats provided for the operators of the vehicles. Each seat design should vary based upon the length of time of typical usage, the type of vehicle, the impact loadings and stresses imposed on the seat, and the demands, if any, placed upon the passenger using the seat.

Seats provided for the operator preferably provide a range of adjustment. For example, the seat frame may be adjustable vertically and in a fore and aft direction. Also, provision will usually be made for tilting the seat cushion about a transverse axis. The adjustment features permit the seat to be used comfortably by a wide variety of people of different physical characteristics. The adjustment features permit the riding position of the operator to be changed in order to reduce fatigue. Further, the operators or drivers, and passengers are often subjected to repeated and excessive jarring impacts primarily due to the type of vehicle, its size, its manner of use and the loads being transported. Such jarring and large motion type jerking movements are particularly acute with long haul, over-the-road type vehicles such as large trucks and semi-trailer type vehicles.

In an attempt to isolate the vehicle operator from such jarring or large movement motions, devices, commonly known as anti-slap mechanisms, have been incorporated into the operator's seat. Anti-slap mechanisms in effect permit the vehicle cab within which the base of the seat is mounted and the seat frame to move independently of each other within certain limits. This independent motion isolates the seat frame and hence, the operator from the fatiguing and possibly physically harmful jarring movements. The operator is isolated from the "slap" like action typically experienced during use of the vehicle. Presently known structures have not, however, maintained the full adjustability features of the seat when providing the desirable anti-slap feature.

Another heretofore unsolved problem primarily experienced with operator's seats but which also may be present with other passenger seats, relates to proper alignment of the seat bench with other structures present in the use environment. Vehicles are typically provided with reinforced areas in the floor at which the seats must be mounted. Once installed, the reinforced area is, of course, not easily and economically relocated. As a result, an operator's seat in the cab of a semi-trailer truck, for example, may not be properly aligned with respect to the steering wheel and other controls. The location of the reinforcement provided by the coach, truck, or other vehicle manufacturer may not be compatible with the particular type of seat that the purchaser of the vehicle may want installed. Further, the seat structures may wear or be damaged to the point that replacement is necessary. The types of seats that may be installed as replacements may be restricted due to the location of the reinforced base mounting area. Misalignment or improper location of the operator's seat with respect to the controls of the vehicle can cause increased operator fatigue and reduced operator response time.

SUMMARY OF THE INVENTION

In accordance with the present invention a unique transportation seat is provided whereby the problems heretofore experienced with adjustable seat structures and with proper location of the seats are substantially eliminated. Essentially, the unique transportation seat includes a base and a seat frame to which the seat cushions are attached. The seat frame is supported on the base by a structure including provisions for step-wise fore and aft adjustment of the seat relative to the base, transverse or side saddle adjustment relative to the base for proper alignment of the seat relative to the vehicle control area and for isolating the seat from jerking, jarring or slap type motion of the seat. An air suspension may be incorporated to isolate the seat structure from vertical movement and provision for tilting the seat back and a seat cushion about a transverse axes may also be included.

DETAILED DESCRIPTION OF THE PREFERRED EMBODIMENT

Figure 1:
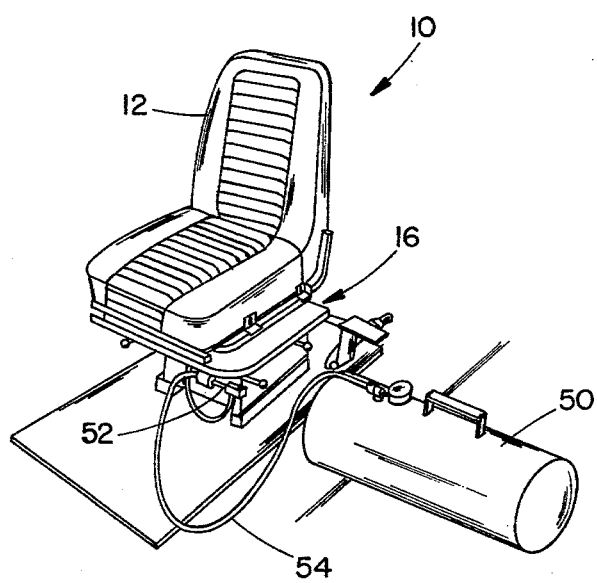
FIG. 1 is a left side perspective view of a transportation seat in accordance with the present invention.
Figure 2:
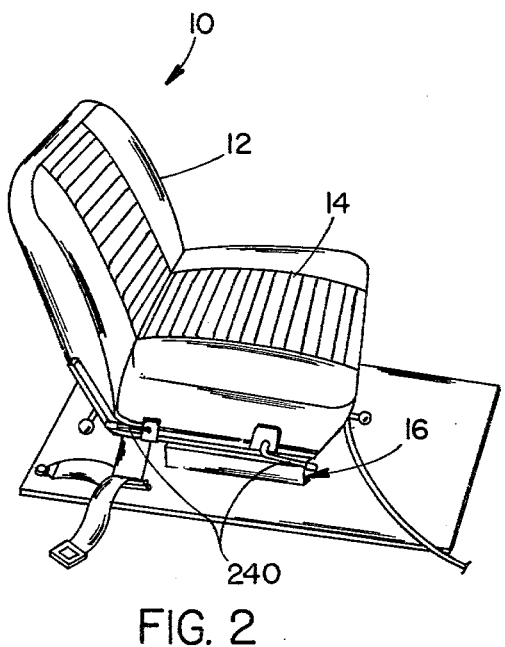
FIG. 2 is a right, elevational view in perspective of the transportation seat.

With reference to FIGS. 1 and 2, the unique transportation seat in accordance with the present invention is illustrated and generally designated 10. The seat 10 includes a tiltable seat back 12, a cushioned seat portion 14 and a base assembly 16 upon which the seat is mounted.

Figure 5:
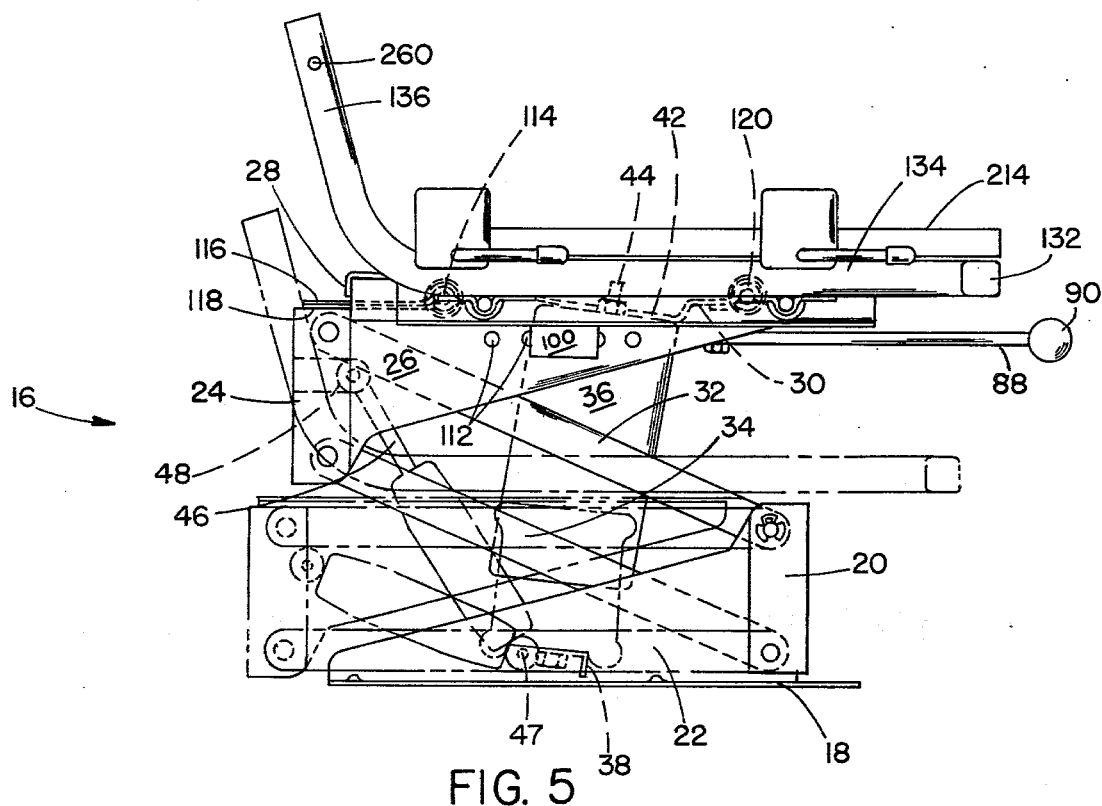
FIG. 5 is a side, elevational view of the seat with the cushions removed.
Figure 6:
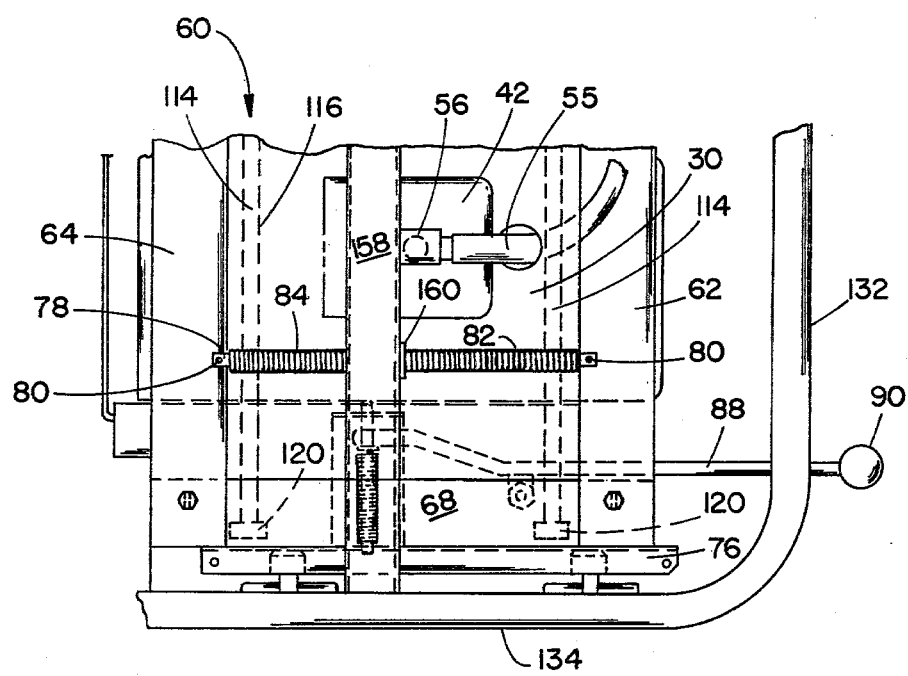
FIG. 6 is a fragmentary, top plan view of the seat.
Figure 7:
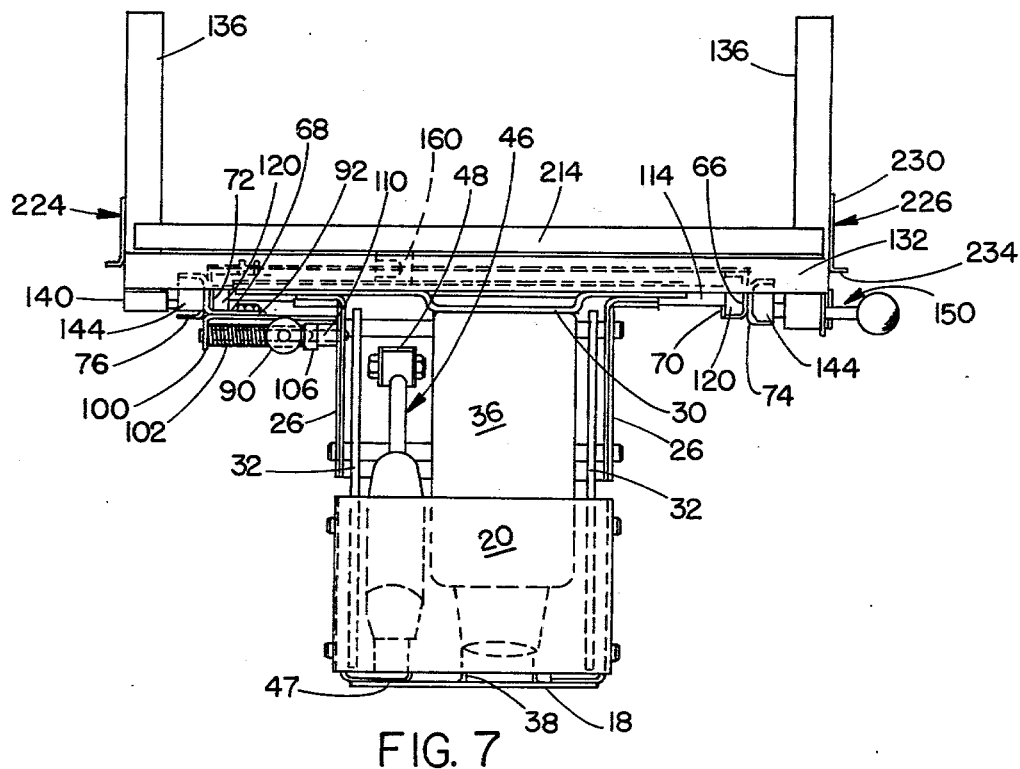
FIG. 7 is a front, elevational view of the seat.

As seen in FIGS. 5, 6 and 7, the base assembly 16 includes a lower base portion having a mounting plate 18 attachable by suitable bolts to the reinforced area of the vehicle floor, a front, vertical support channel 20 and lower side plates 22. The base 16 further includes an upper base or seat supporting portion defined by a rear support channel 24, side plates 26, a reinforcement tube 28 and a cover plate 30 supported on and secured to side plates 26 and rear vertical support channel 24. The upper base is connected to the lower, floor mounting plate by parallel links 32, 34 extending between the front and rear support channels 20, 24 respectively. A suitable air spring 36 is secured at its lower end to the mounting plate 18 at a bracket 38. At its upper end, the air spring 36 is secured generally centrally of the cover plate 30 at a recessed or cupped area 42 by a suitable fastener 44. A shock absorber 46 extends from a lower shock mount defined by a bracket 47 on the mounting plate 18 to an upper shock mount 48 secured to or carried by the rear vertical support channel 24. The base assembly 16 is therefore a damped, vertically adjustable air suspension. The base provides for variable preload due to pressurization of the air spring 36 from a suitable source of air such as an accumulator tank 50 illustrated in FIG. 1. Variation of the preload and the height of the upper portion of the base is achieved through an air control valve 52 connected to the air tank 50 by a suitable hose 54 and the air spring 36 by a length of hose 55 and a coupling 56 (FIG. 6).

FORE AND AFT ADJUSTMENT MECHANISM

Figure 8:
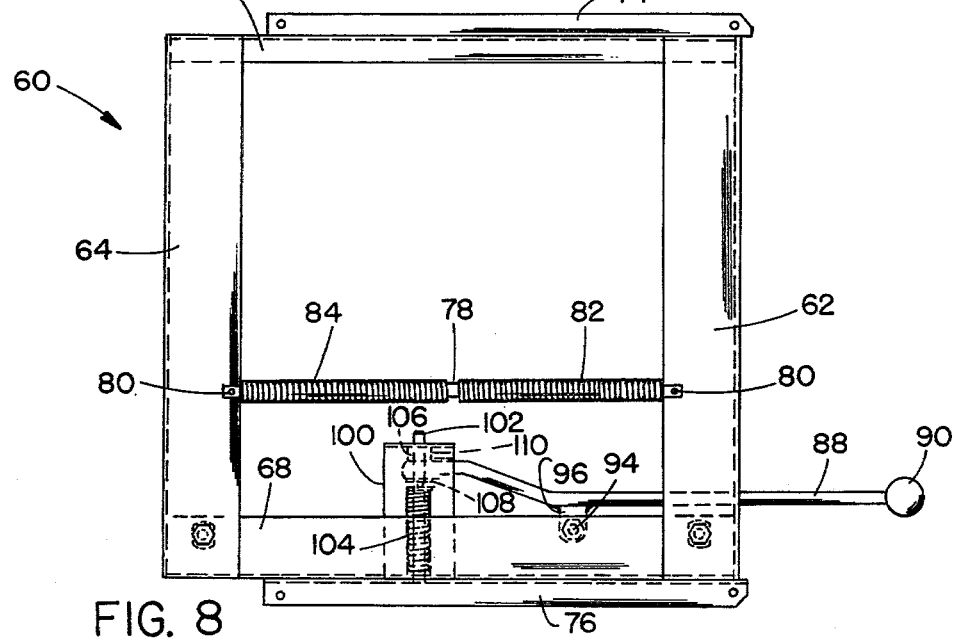
FIG. 8 is a top plan view of a track support frame assembly incorporated in the seat.
Figure 17:
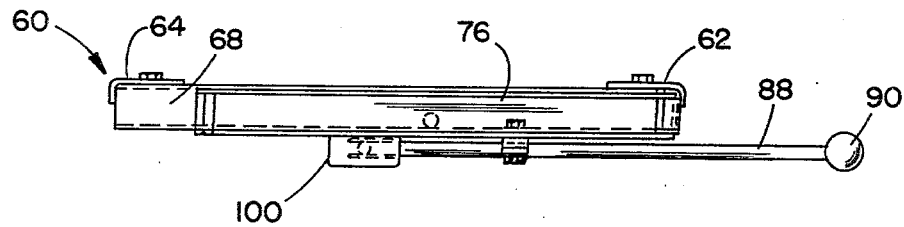
FIG. 17 is a side, elevational view of the track support assembly of FIG. 8.

A track support frame assembly 60 is carried by the upper base for fore and aft, step-wise adjustment. As best seen in FIGS. 8 and 17, the track support frame 60 includes a front, channel shaped, track support member 62, a rear, channel shaped, track support member 64, a left side fore and aft track channel 66 and a right side fore and aft channel 68 joining the front and rear track support members. The channel members 66, 68 are positioned in opposed, face-to-face relationship to define inwardly opening tracks, guides or roller trackways 70, 72 (FIG. 7).

An anti-slap channel or roller trackway 74 extends in fore and aft direction and is carried by the fore and aft channel 66. Fore and aft channel 68 similarly carries an anti-slap channel or roller trackway 76. Extending between the front and rear track support members 62, 64 is an elongated rod 78. The rod 78 is secured at its ends to a respective support member 62, 64 by pins 80. Disposed on the rod 78 are anti-slap centering springs 82, 84. The anti-slap mechanism including channels 74, 76, centering rod 78, and centering springs 82, 84 will be described in detail below.

A fore and aft adjustment lever 88, including a hand knob 90 is pivotally secured to a lower web 92 of the right side fore and aft channel 68 by a suitable fastener 94 at a pivot plate or bracket 96. Also supported on the outer surface of the lower web 92 of channel 68 is a latch pin bracket 100. The latch pin bracket 100 is generally U-shaped and supports a latch pin 102 for transverse movement. Disposed on the latch pin 102 is a spring 104 abutting the bracket at one end and a yoked end 106 of the latch lever 88. A pin and washer 108 are positioned between the spring 104 and the yoked end 106 of the lever. Rotation of the lever 88 in a counterclockwise direction when viewed in FIG. 8 shifts the latch pin 102 within a guide 110. As seen in FIG. 5, the side plate 26 of the upper base sub-assembly includes a plurality of equally spaced, longitudinally arranged adjustment holes 112. The adjustment holes 112 are dimensioned to receive the latch pin 102.

As best seen in FIGS. 5, 6 and 7, a pair of parallel, spaced, transversely arranged rods 114 are secured to the cover plate 30. The rods 114 are fixedly secured to the cover plate 30 by an upper strap 116 carried by the cover plate 30 and a lower strap 118 secured to the support channel 24. The straps 116, 118 capture each rod 114 adjacent each end thereof. Rotatably supported on the ends of each rod 114 are fore and aft adjustment rollers 120. The fore and aft rollers 120 at each of the ends of the rods 114 ride within the trackways defined by fore and aft channels 66, 68 of the track support frame. The track support frame sub-assembly 60 is therefore supported on the base 16 for sliding movement in a fore and aft direction. The latch assembly provides for latched, step-wise fore and aft adjustment and locks the sub-assembly 60 to the base by selective placement of the latch pin 102 in one of the adjustment holes 112.

ANTI-SLAP SUB-ASSEMBLY

Figure 9:
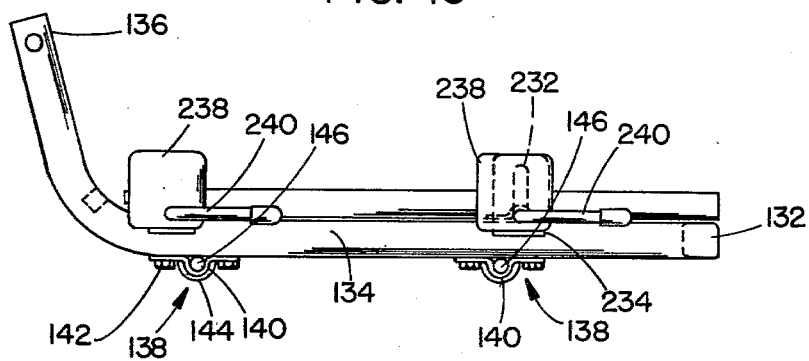
FIG. 9 is a side, elevational view of an upper seat frame assembly.
Figure 11:
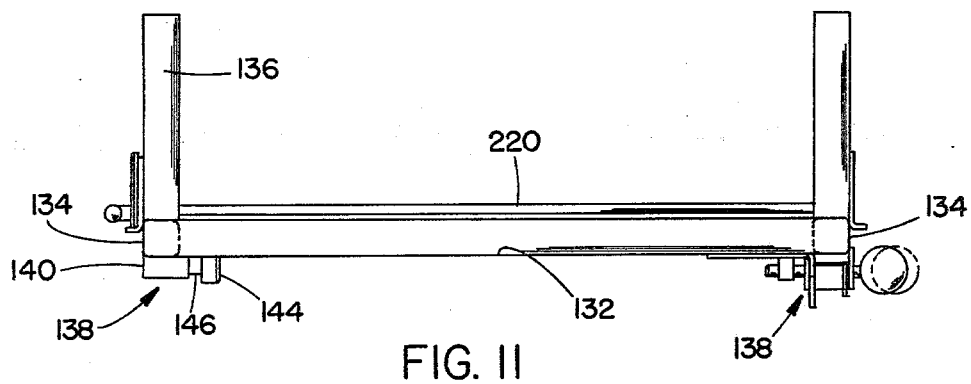
FIG. 11 is a front, elevational view of the upper seat frame assembly of FIG. 9.

In the embodiment illustrated in FIGS. 5, 6 and 7, an upper, generally tubular seat frame or ring 130 is supported on the frame sub-assembly 60. The seat ring 130 includes a front stretcher 132, side stretchers 134 and upwardly angled seat back attachment portions 136. As seen in FIGS. 9 and 11, each of the side stretcher portions 134 carry anti-slap roller assemblies 138 in fore and aft spaced relationship. Anti-slap roller assemblies 138, each include an attachment bracket or strap 140 secured to the undersurface of stretcher portion 134 by suitable fasteners 142. The brackets 140 each clamp a roller axle 146 to support a roller 144. As seen in FIGS. 5 and 7, the frame or seat ring 130 is supported on the sub-assembly frame 60 by the rollers 144 which are received within a respective one of the anti-slap channels 74, 76.

A two position, anti-slap lock-out pin assembly 150 (FIG. 12) allows selective use of the anti-slap mechanism. The lock-out assembly includes a case 152 secured to the undersurface of a side stretcher 134. The vertical web portion of the anti-slap channel 74 on the same side as the lock-out assembly 150 includes an aperture or lock-out hole therethrough adapted to receive the non-headed end 154 of pin assembly 150 when the seat frame or seat ring 130 is centered with respect to the sub-frame 60. Assembly 150 permits the anti-slap feature of the present invention to be selectively employed.

As seen in FIG. 6, an intermediately positioned centering support channel 158 extends between the side stretchers 134 in spaced, parallel relationship with the front stretcher 132. Secured to the intermediate channel 158 is a centering spring deflector bracket 160. The bracket 160 extends downwardly, at least partially surrounds the centering rods 78 and is abutted by centering springs 82, 84. The centering springs 82, 84 therefore bias the seat frame 130 to a "centered" position relative to the frame sub-assembly 60. The springs 82, 84 also absorb impact energy or loadings imparted to the base 16 due to jerking or jarring type large motions of the vehicle within which the seat is mounted. The anti-slap mechanism isolates the seat frame 130 from motions of the base 16 and permits the seat frame 130 to move independently of the base 16. Also, since separate rollers and trackways are employed for the anti-slap mechanism, fore and aft adjustment of the seat due to shifting or sliding movement of the sub-assembly 60 is not affected by use of the anti-slap mechanism. When the anti-slap feature is employed, the centering position of the seat frame relative to the base and the fore and aft positioning of the seat relative to the controls of the vehicle will not be affected.

SIDE SADDLE ADJUSTMENT SUB-ASSEMBLY

Figure 13:
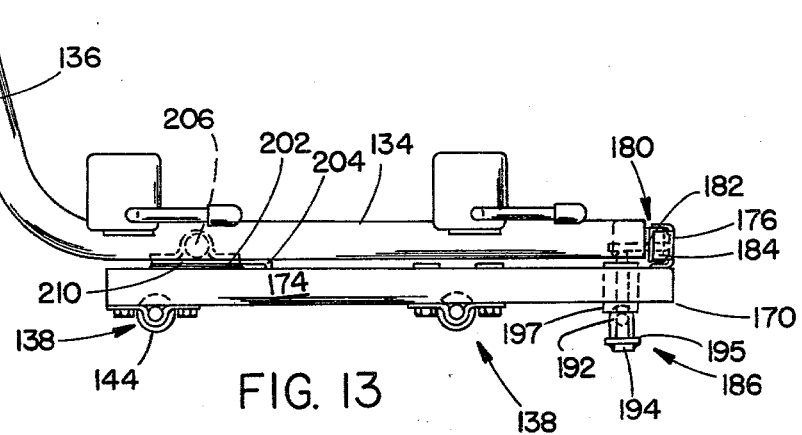
FIG. 13 is a side, elevational view of an upper seat sub-assembly incorporating the side saddle adjustment mechanism in accordance with the present invention.
Figure 15:
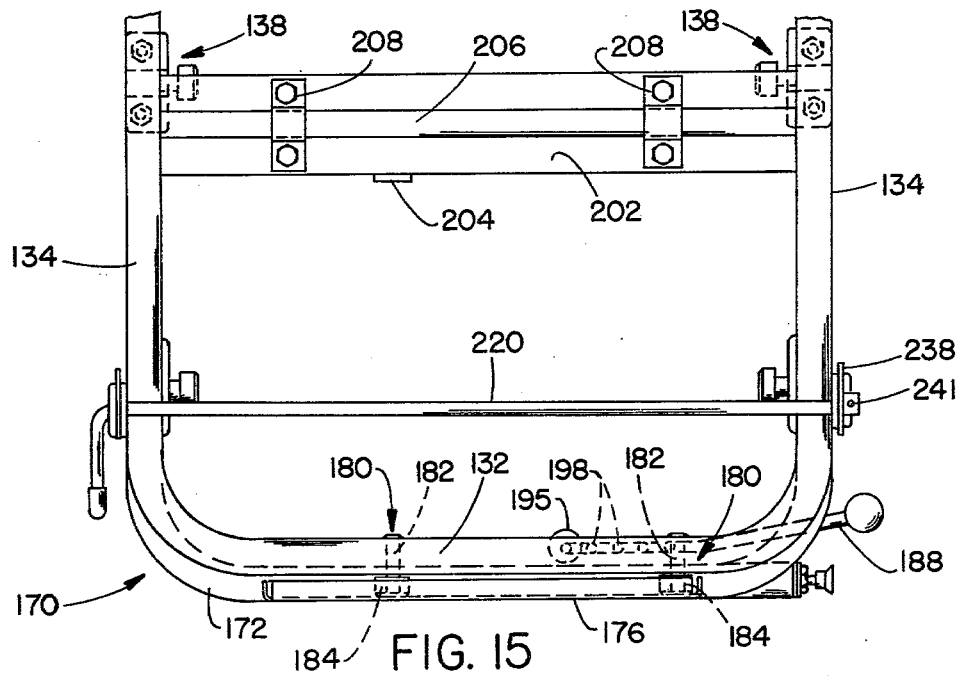
FIG. 15 is a top plan view of the assembly of FIG. 13.
Figure 14:
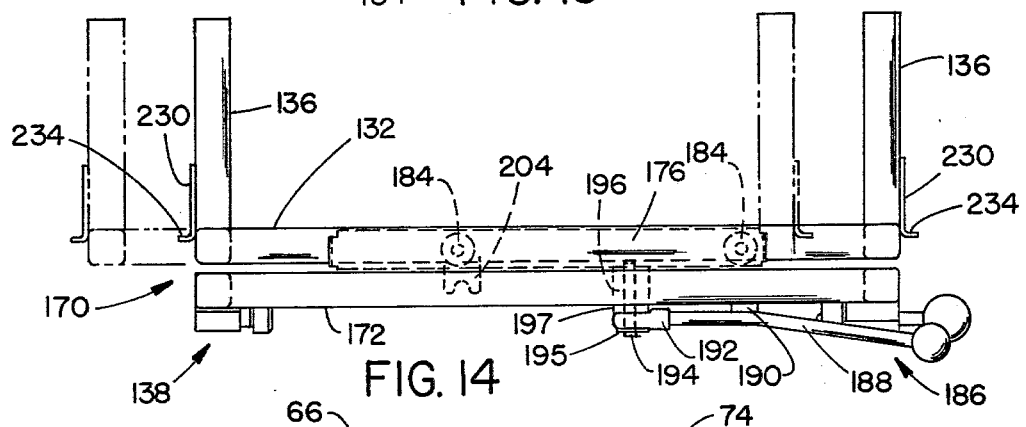
FIG. 14 is a front, elevational view of the sub-assembly of FIG. 13.

When replacing a seat in a vehicle or when installing a seat as original equipment in the vehicle, it is important that the seat be positioned in line with the steering column or other operating controls within the vehicle. A side saddle adjustment mechanism in accordance with the present invention may be incorporated into the seat to ensure proper alignment of the seat with the operating controls. The side saddle adjustment mechanism is illustrated in FIGS. 13, 14 and 15. As shown therein, a lower seat ring or intermediate seat frame 170 is included. The anti-slap roller assemblies 138 are secured to the intermediate frame 170. The lower seat frame 170 includes a front stretcher 172 and side stretchers 174 to which the anti-slap roller assemblies 138 are secured. Attached to the front stretcher 172 is a transversely extending side saddle adjustment channel or trackway 176. The channel 176 extends parallel to the front stretcher 132 of the upper seat frame or ring 130. As best seen in FIG. 15, a pair of transversely spaced side saddle adjustment roller assemblies 180 are secured to and carried by the front stretcher 132. Each roller assembly 180 includes an axle 182 and a roller 184 extending from the front of the stretcher 132. The rollers 184 ride within the side adjustment channel 176.

In the embodiment of FIGS. 13, 14 and 15, a centering support channel 202 extends between the side stretchers 174 of the lower seat ring or frame 170. A spring deflector bracket 204 is secured to the forward edge of the support channel 202. The deflector bracket 204 encircles the centering rod 78 of sub-assembly 60 to center seat frame 170 when the anti-slap sub-assembly is used. Extending between the side stretchers 134 of the upper seat frame 130 is a slide rod or tube 206. The slide rod 206 extends in spaced, parallel relationship with the front stretcher 132 and is slidably mounted on a support channel 202 by a pair of transversely spaced guides or straps 208. As seen in FIG. 13, it is preferred that a flat, nylon bearing member 210 be secured between the brackets 208 and the support channel 202. Members 210 provide lubrication for the sliding action of the rod 206 upon transverse adjustment of the upper seat frame. The rod 206 and the transversely spaced rollers 180, 186 provide for fore and aft stability of the upper seat frame 130 relative to the lower seat frame 170 during stepwise lateral adjustment.

Figure 3:
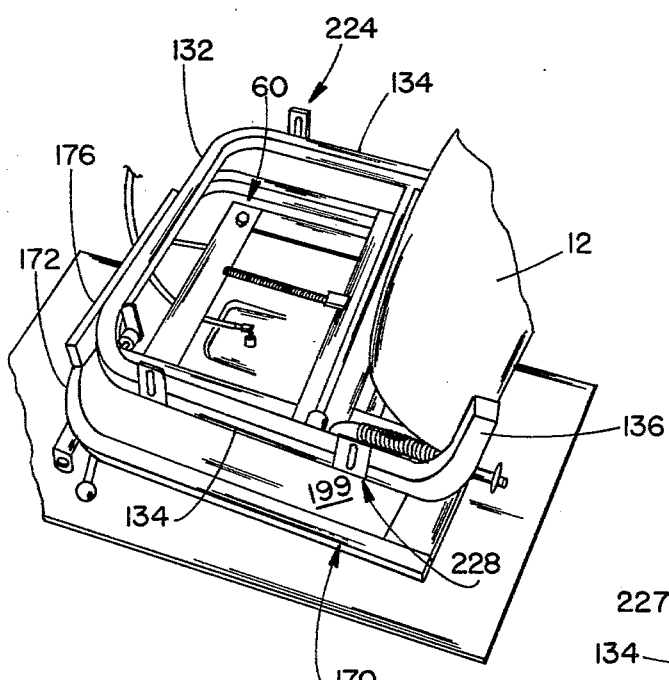
FIG. 3 is a fragmentary, perspective view of the unique seat with the seat cushion removed.
Figure 4:
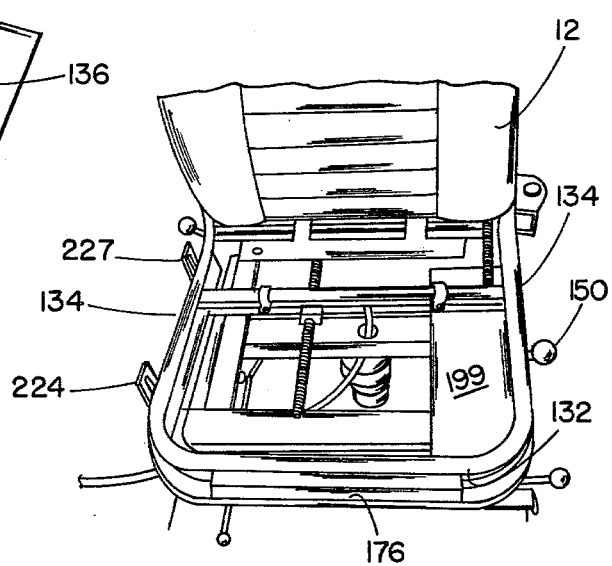
FIG. 4 is the front, fragmentary, perspective view of the seat.

A side saddle latch adjustment assembly 186 permits step-wise transverse or side saddle adjustment of the upper seat frame 130 relative to the lower seat ring 170 and base 16. The latch 186 includes a latch lever 188 pivotally secured to the front stretcher 172 of the lower frame at a pivot plate 190. Lever 188 supports a yoke member 192 at one end. The yoke member 192 surrounds a latch pin 194 and rests on top of a washer 195. The latch pin is guided by a bracket 197 and is biased upwardly by a spring 196. Pin 194 extends within one of a plurality of side adjustment holes 198 formed in the undersurface of the tubular front stretcher 132 of the upper seat ring 130. A guard plate 199 is secured to lower seat ring 170 to cover the opening in the lower ring when the upper seat frame is shifted transversely (FIGS. 3 and 4).

The upper seat frame 130 may be transversely adjusted relative to the base 116 to any of a plurality of positions. The side saddle adjustment mechanism permits transverse shifting of the seat relative to a steering wheel or other operator control for optimum positioning. This feature of the present invention permits the driver seat to be readily employed as a replacement item in existing vehicles. Further, another measure of seating position adjustment is provided to alleviate fatigue caused by extended periods of driving.

CUSHION TILT MECHANISM

Figure 10:
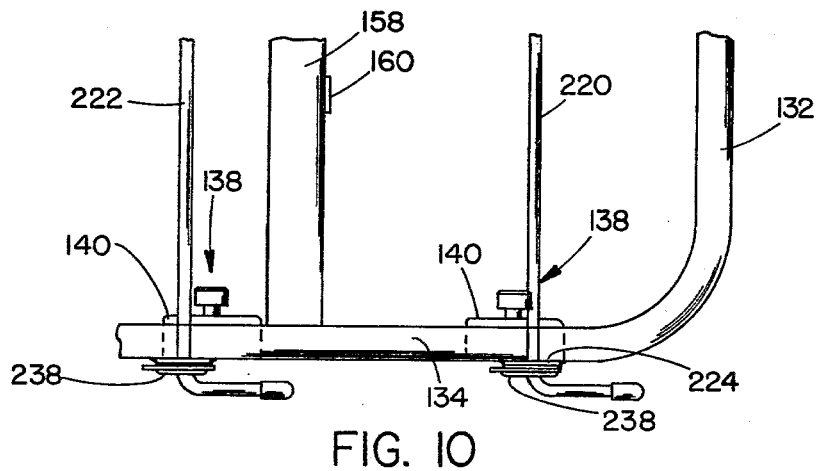
FIG. 10 is a fragmentary, top plan view of the upper seat assembly of FIG. 9.
Figure 12:
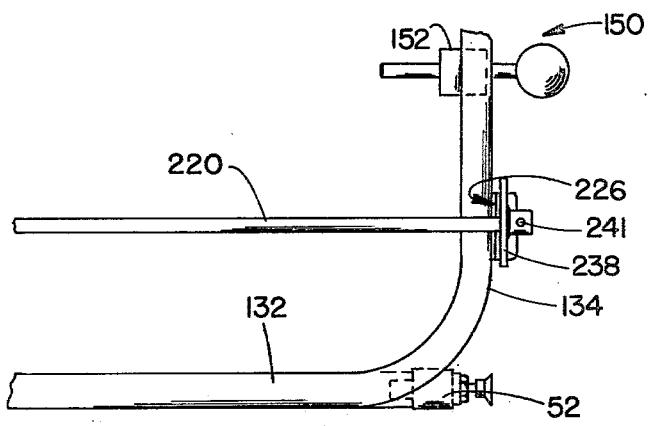
FIG. 12 is a fragmentary, top plan view of the upper seat sub-assembly of FIG. 11.
Figure 16:
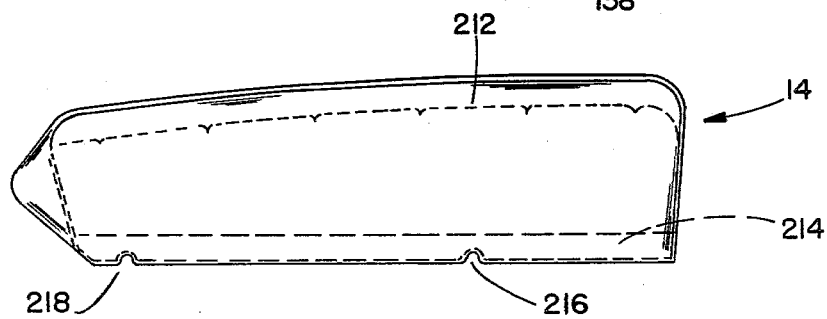
FIG. 16 is a side, elevational view of a lower seat cushion assembly in accordance with the present invention.

The lower seat cushion 14, illustrated in FIG. 16, includes a covered, upper padded portion 212 secured to a seat board or base member 214. The undersurface of the seat board 214, which may be cut from plywood, is formed with a pair of transversely extending, parallel, spaced recesses 216, 218. The recesses are positioned to receive a pair of spaced, transversely extending tilt adjustment rods 220, 222 (FIG. 10). The seat cushion is secured to the rods 220, 222 by plates extending over the recesses 216, 218 and fastened to the undersurface of the seat board 214. The tilt adjustment rods 220, 222 extend between adjustment guide plates 224, 226 and 227, 228 respectively. As seen in FIGS. 7 and 9, each tilt adjustment guide plate is generally L-shaped and includes a vertical portion 230 having a guide slot 232 and a horizontal portion 234 extending outwardly from the sides of the side stretchers 134 the upper seat frame. Resting on the horizontal portions 234 of each of the guide plates is a tilt plate 238. As seen in FIG. 9 each tilt plate 238 is generally rectangular in shape and a rod 220, 222 extends through an aperture formed therein. The rod is secured thereto adjacent one end of the plate. One end of each of the rods 220, 222 is angled to define a tilt lever 240. The opposite ends of the rods are secured to plates 238 by bushings 241 welded to the plates (FIG. 12).

As should be readily apparent, rotation of one of the tilt rods 220 will cause a tilt plate 238 to change its position or cam on a horizontal portion 234 of one of the guide plates, therby raising and lowering a rod 220, 222 within a guide slot 232. Selective placement of the tilt plates results in multiple forward and rearward tilt adjustment of the seat cushion 14 (FIG. 2).

SEAT BACK SUB-ASSEMBLY

Figure 19:
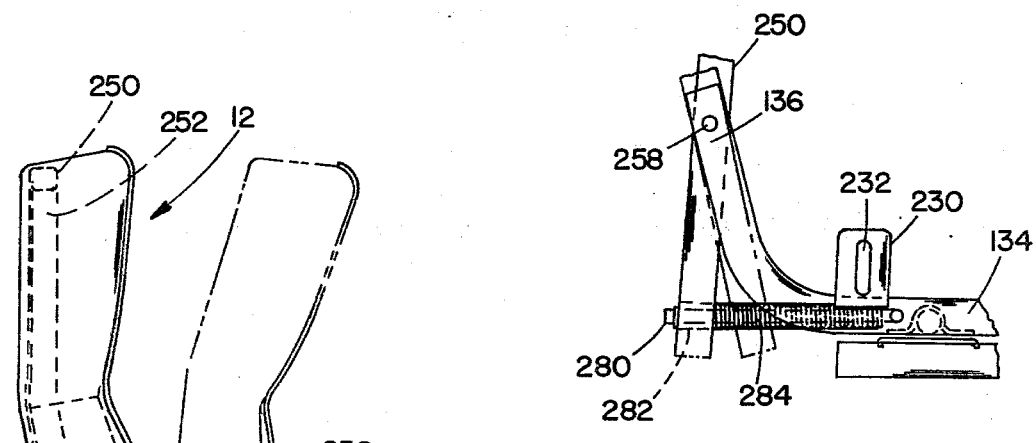
FIG. 19 is a fragmentary, side elevational view of an alternative seat back tilt assembly.
Figure 18:
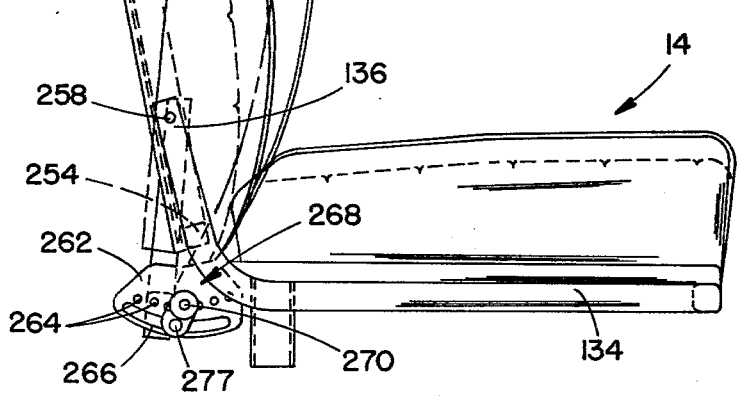
FIG. 18 is a side, elevational view of an upper seat assembly including a back tilt mechanism.

As seen in FIGS. 18 and 19, the seat back 12 of the seat 10 is preferably pivotally secured to the upper seat frame stretcher portions 136 to provide for recline or tilt adjustment of the seat back. Seat back 12 preferably includes a tubular, generally U-shaped member defining side uprights 250, an upper cross piece 252 and a lower cross piece 254. A back panel is secured to the tubular portions to support suitable padding material. The seat back is then covered by a suitable material 256. Pivot pins 258 extend through suitable apertures 260 formed in stretcher portions 136 to pivotally mount the seat back 12 adjacent to the lower end to the seat frame 130.

In the embodiment illustrated in FIG. 18 a back tilt adjustment plate 262 is weldably or otherwise suitably secured to the stretcher portion 136. The adjustment plate 262 includes a plurality of adjustment holes 264 and a guide slot 266. A retainer 268 includes a shiftable pin 270 positionable within one of the adjustment holes 238 and a cross pin 277 extending through the slot 266. The lower end of upright 250 abuts against the pin 277. As a result, the seat back 12 will be retained in a predetermined position based upon the location of retainer 268.

In the embodiment illustrated in FIG. 19, the seat back 12 is spring biased to an upright, generally vertical position. A fixed guide rod 280 is secured to side stretcher 134 of the upper seat frame and extends in a rearward direction. The fixed guide rod 280 extends through an enlarged bore 282 formed adjacent the lower end of upright 250. Disposed between the upright 250 and the end of the guide rod 280 secured to the side stretcher 134, is a biasing means 284 illustrated in the form of a coil spring. The uprights 250 are therefore biased to a generally vertical position and may be reclined or tilted above pivot point 258 against the bias of spring 264.

OPERATION

In view of the foregoing description, the operation of the unique operator's seat in accordance with the present invention should now be readily apparent. The base 16 may be vertically adjusted by suitable manipulation of the air control valve 52. The parallelogram linkage maintains the upper base portion horizontal to the lower mounting plate. The seat may then be adjusted for fore and aft positioning by merely grasping the fore-and-aft adjustment lever 88, moving the pin 102 out of an aperture 112 and shifting the sub-assembly 60 in a fore or aft direction to the desired adjustment hole 112. The operator may adjust the transverse or side saddle positioning of the upper seat frame by selective placement of latch pin 194. The operator will grasp the lever 188 thereby removing the pin 194 from the adjustable holes 198 in the upper seat frame. The upper seat frame may then be shifted relative to the lower seat frame and hence, the base structure to the desired transverse position.

The anti-slap mechanism may be actuated by grasping the anti-slap lock-out pin 150 thereby allowing the roller assemblies 138 to shift within the channels 74, 76 against the bias of springs 82, 84. In effect, the base 16 is permitted to move independently of the seat frame and the anti-slap mechanism is an inertia type device. The desired positioning of the cushion 14 is readily obtained by grasping the tilt levers and shifting the position of the cushion tilt plates on their support and guide brackets.

It is presently preferred that the upper seat ring and lower seat ring be fabricated from 16 gauge tubular cold rolled steel. The fore and aft adjustment channels and side saddle adjustment channel are preferably fabricated from 14 guage cold rolled steel and the anti-slap channels are preferably fabricated from 11 gauge Y.S.T. Also, it is presently preferred that the bend area in the upper seat ring be reinforced by inserting a tubular member in this area. The anti-slap centering springs are preferably fabricated from 0.074 inch diameter spring wire and have a mean diameter of 0.526 inch, a free length of 8.5 inch, a compressed length of 4.5 inch, 50 active coils and a compression load of 18 lbs. The front and rear track supports of sub-assembly 60 may be fabricated from 11 gauge cold rolled steel. The anti-slap adjustment and fore and aft adjustment rollers may be fabricated from bronze (Oilite) Delrin AF or Oilon Pv 80.

The unique operator seat in accordance with the present invention effectively isolates the operator from vertical as well as fore and aft jostling or slap type motions of the vehicle. The seat is readily adapted to existing vehicles due to the side saddle adjustment and also permits accurate alignment of the seat relative to the vehicle controls. The seat is capable of a wide range of positions which may be adapted to reduce operator fatigue. The construction of the seat allows the manufacturer to selectively include vertical adjustment, fore and aft adjustment, side saddle adjustment and/or an anti-slap mechanism depending upon the needs of the purchaser. For example, side saddle adjustment is easily added with the inclusion of a lower seat ring, channel track and latch mechanism. Therefore, a wide range of seat types may be supplied with some or all of the adjustment features. The unique operator seat in accordance with the present invention is relatively easily manufactured by bending the various tubular components and by simple forming from sheet metal. The seat includes adjustment capabilities not heretofore provided and also possesses weight advantages when compared to the prior cast seat components.

In view of the foregoing description, those of ordinary skill in the art will undoubtedly envision various modifications which will not depart from the inventive concepts disclosed herein. For example, the various components could be manufactured as cast items although the tubular and sheet metal components are preferred due to weight and strength considerations. Further, a simple slide track could be employed for the fore and aft adjustment as opposed to the track and roller combination illustrated. Also, various back tilt mechanisms may be employed in the operator seat. It is expressly intended, therefore, that the above description should be considered as that of the preferred embodiment only. The true spirit and scope of the present invention may be determined by reference to the appended claims.

The embodiments of the invention in which an exclusive property or privilege is claimed are defined as follows.

1. In a transportation seat primarily adopted for use as a driver's seat, of the type including a base adapted to be secured to a floor structure and a seat frame supported on said base, the improvement comprising:
    side saddle adjustment means supported by said base and operatively engaging said seat frame for transversely adjusting the position of said seat frame relative to said base, said side saddle adjustment means comprising:
    a transverse guide track carried by said base;
    at least one roller having an axle secured to said seat frame, said roller riding on said guide track; and
    latch means carried by said base and operatively engaging said seat frame for latching said seat frame in a plurality of transverse positions relative to said base, said seat frame including a pair of transversely spaced side members and wherein said side saddle adjustment means further includes a slide rod extending between said seat frame side members and a guide bracket carried by said base and at least partially surrounding said slide rod so that said slide rod may shift transversely relative to said guide bracket and said base.

2. In a transportation seat as defined by claim 1 wherein said improvement further includes:
fore and aft adjustment means supported on said base and operatively engaging said seat frame for slidably mounting said seat frame on said base for fore and aft, stepwise adjustment.

3. In a transportation seat as defined by claim 2 wherein said fore and aft adjustment means comprises:
a track support frame supporting said seat frame;
a pair of longitudinally spaced rollers; and
means for securing said rollers to said base, said track support frame including a fore and aft trackway channel and said longitudinally spaced rollers riding in said fore and aft trackway channel.

4. In a transportation seat as defined by claim 3 further including anti-slap means operatively engaging said seat frame for allowing movement of said seat frame in a fore and aft direction relative to said track support frame to isolate said seat frame from movement of said base.

5. In a transportaion seat as defined by claim 1 further including:
anti-slap means operatively engaging said seat frame for allowing movement of said seat frame in a fore and aft direction relative to said base to isolate said seat frame from movement of said base.

6. In a transportation seat as defined by claim 5 wherein said anti-slap means comprises:
a longitudinally extending anti-slap track defining member supported on said base; and
at least one anti-slap roller carried by said seat frame and riding on said anti-slap track defining member.

7. A vehicle seat, comprising:
a base including means for securing the base to the floor of a vehicle;
a track support frame having a pair of spaced, fore and aft trackways;
means carried by said base for slidably mounting said track support frame on said base for step-wise fore and aft adjustment;
a seat frame; and
transverse adjustment means operatively connected to said seat frame for mounting said seat frame for transverse adjustment relative to said base, said transverse adjustment means comprising:
an intermediate seat frame supported on said track support frame, said intermediate seat frame including a front member and spaced side members;
a transverse adjustment trackway fixedly positioned on said front member of said intermediate seat frame; and
at least one roller carried by said seat frame and disposed within said transverse adjustment trackway, said seat frame including a front stretcher and spaced side stretchers, said roller being carried by said front stretcher and wherein said transverse adjustment means further includes:
a slide rod extending between said side stretchers of said seat frame; and
guide means on said intermediate frame for guiding said slide rod for transverse movement relative to said intermediate frame.

8. A vehicle seat as defined by claim 7 further including latch means carried by said intermediate frame and engaging said seat frame for step-wise latched adjustment of said seat frame relative to said intermediate frame.

9. A vehicle seat, comprising:
a base including means for securing the base to the floor of a vehicle;
a track support frame;
means carried by said base for slidably mounting said track support frame on said base for step-wise fore and aft adjustment;
a seat frame; and
transverse adjustment means operatively connected to said seat frame for mounting said seat frame for transverse adjustment relative to said base, comprising:
an intermediate seat frame supported on said track support frame, said intermediate seat frame including a front member and spaced side members;
a transverse adjustment trackway fixedly positioned on said front member of said intermediate seat frame;
at least one roller carried by said seat frame and disposed within said transverse adjustment trackway; and
anti-slap means operatively engaging said seat frame for allowing movement of said seat frame in a fore and aft direction independently of and relative to said track support frame to isolate said seat frame from movement of said base.

10. A vehicle seat, comprising:
a base including means for securing the base to the floor of a vehicle;
a track support frame,
means carried by said base for slidably mounting said track support frame on said base for step-wise fore and aft adjustment;
a seat frame;
transverse adjustment means operatively connected to said seat frame for mounting said seat frame for transverse adjustment relative to said base; and
anti-slap means operatively engaging said seat frame for allowing movement of said seat frame in a fore and aft direction independently of and relative to said track support frame to isolate said seat frame from movement of said base, said anti-slap means comprising:
a longitudinally extending anti-slap track defining member fixedly secured to said track support frame; and
at least one anti-slap roller carried by said seat frame and riding on said anti-slap track defining member.

11. A vehicle seat as defined by claim 10 wherein said anti-slap means further comprises means on said track support frame operatively engaging said seat frame for biasing said seat frame to a generally central position relative to said track support frame.

12. A vehicle seat as defined by claim 11 wherein said biasing means comprises:
a fixed rod extending in a fore and aft direction on said track support frame;
a guide member operatively carried by said seat frame and extending at least partially around said fixed rod; and
spring means on said rod and engaging said guide member for biasing said seat frame to a generally central position relative to said track support frame.

13. A vehicle seat as defined by claim 12 wherein said spring means comprises a first coil spring disposed on said fixed rod and engaging one side of said guide member and a second coil spring on said fixed rod and engaging the other side of said guide member.

14. A vehicle seat as defined by claim 12 further including a seat cushion having a bottom member; and means on said seat frame and a portion of which engages said bottom member of said seat cushion for varying the fore and aft tilt of said cushion.

15. A vehicle seat as defined by claim 14 wherein said means for varying the fore and aft tilt of said cushion comprises:
- a pair of spaced guide brackets, one secured at each side of said seat frame and each having an elongated guide slot therein;
- a tilt rod extending between said guide brackets and through said slots; and
- a pair of cam plates, one secured to each end of said tilt rod and engaging a respective one of said guide plates.

16. A vehicle seat as defined by claim 15 wherein said base comprises:
- a pair of spaced side plates;
- a cover plate extending between said side plates;
- parallel linkage means extending from one of said side plates to said base mounting means for maintaining said cover plate in a generally horizontal position as said cover plate raises and lowers with respect to said base mounting means; and
- variable spring means extending from said mounting means to said cover plate for suspending said cover plate and permitting vertical height adjustment of said cover plate.

17. An improved transportation seat of the type including a base securable to a vehicle floor and a seat frame supported on said base, the improvement comprising:
- anti-slap means carried by said base and operatively supporting said seat frame for allowing movement of said seat frame in a fore and aft direction relative to said base to thereby isolate said seat frame from jarring movements of said base; and
- side saddle adjustment means carried by said base and supporting said seat frame for allowing transverse adjustment of said seat frame relative to said base, said side saddle adjustment means comprising:
  - a transversely extending slide rod attached to said seat frame;
  - means for mounting said slide rod for transverse movement relative to said base; and
  - latch means supported by said base for latching said seat frame in one of a plurality of transverse positions relative to said base, said anti-slap means comprising:
    - a pair of fore and aft extending transversely positioned anti-slap guide tracks carried by said base; and
    - means operatively connected to said seat frame and riding in said guide tracks for permitting fore and aft movement of said seat frame relative to said base, said anti-slap means further comprising:
      - a centering member fixed relative to said base and extending in a fore and aft direction parallel to and between said anti-slap guide tracks;
      - a guide member operatively connected to said seat frame; and
      - biasing means on said centering member and engaging said guide member for biasing said seat frame to a generally central position relative to said base and for absorbing energy imparted to said seat frame due to movement of said base; and said seat further including an intermediate frame positioned between said seat frame and said base, said slide rod mounting means being directly secured to said intermediate frame and said means operatively connected to said seat frame for permitting fore and aft movement including at least one roller directly mounted to said intermediate frame, said side saddle adjustment means further including:
        - a transverse channel mounted on said intermediate frame; and
        - a pair of transversely spaced rollers mounted on said seat frame and riding within said transverse channel.

18. A seat cushion tilt device for varying the tilt position of a seat cushion having a base member supported on a seat frame, said device comprising:
- a first pair of transversely spaced guide brackets, each having a vertical portion defining an elongated slot and a horizontal portion, each of said brackets being secured at one side of the seat frame;
- a first elongated tilt rod extending between said brackets and through said slots; and
- a first pair of tilt plates each non-rotatably secured to an end of said first tilt rod and resting on the horizontal portion of the brackets of said first pair, said base member of said seat cushion being supported on said first rod;
- a second pair of transversely spaced guide brackets each having a vertical portion defining an elongated slot and a horizontal portion, said second pair of brackets being secured to said seat frame in longitudinally spaced relationship relative to said first pair of brackets;
- a second elongated tilt rod extending between said second pair of brackets and through said slots of said second pair of brackets;
- a second pair of tilt plates, each non-rotatably secured to an end of said second elongated tilt rod and resting on the horizontal portion of one of said brackets of said second pair, said base member of said seat cushion also being supported on second elongated tilt rod.

19. A seat cushion tilt device as defined by claim 18 wherein said base member defines elongated recesses within which said tilt rods are received.

20. A seat cushion tilt device as defined by claim 18 wherein one end of each of said tilt rods is bent to define a tilt lever.

* * * * *